(12) United States Patent
Volponi (10) Patent No.: US 7,702,447 B2
(45) Date of Patent: Apr. 20, 2010

(54) METHOD AND SYSTEM FOR IDENTIFYING GAS TURBINE ENGINE FAULTS

(75) Inventor: Allan J. Volponi, West Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 72 days.

(21) Appl. No.: 11/641,566

(22) Filed: Dec. 18, 2006

(65) Prior Publication Data

US 2008/0147290 A1  Jun. 19, 2008

(51) Int. Cl.
*G06F 19/00* (2006.01)
(52) U.S. Cl. .................. 701/100; 701/29; 73/116.01
(58) Field of Classification Search ............ 701/30, 701/31, 34, 35, 39, 100, 101, 108; 73/112.01, 73/116.03; 60/272
See application file for complete search history.

(56) References Cited

U.S. PATENT DOCUMENTS

2004/0088100 A1* 5/2004 Volponi ............... 701/100

2005/0096873 A1* 5/2005 Klein ................... 702/184

FOREIGN PATENT DOCUMENTS

EP  1288644 A2  5/2003
EP  1418481 B1  12/2005

OTHER PUBLICATIONS

European Search Report dated May 20, 2009.

\* cited by examiner

*Primary Examiner*—Tuan C To
*Assistant Examiner*—R. M.
(74) *Attorney, Agent, or Firm*—Bachman & LaPointe, P.C.

(57) ABSTRACT

An isolation method and system is described for distinguishing between turbine case cooling (TCC) and high pressure turbine (HPT) performance faults. A trend is observed in gas path parameter data during cruise and a resulting percent Δ signature across the shift in the gas path parameters is assignable to either an HPT or TCC performance fault. During either fault, exhaust gas temperature (EGT) will shift upward. Since take-off EGT margin is calculated from take-off data, the shift, or lack of shift in EGT margin may be used to differentiate between TCC and HPT faults.

9 Claims, 6 Drawing Sheets

METHOD AND SYSTEM FOR IDENTIFYING GAS TURBINE ENGINE FAULTS

BACKGROUND OF THE INVENTION

The invention relates generally to the field of gas turbine engine modeling. More specifically, the invention relates to methods and systems that distinguish between turbine case cooling (TCC) and high pressure turbine (HPT) performance faults.

Gas turbine performance diagnostics concerns itself with tracking changes in engine module performance measures (typically efficiency and flow parameters) as the engine deteriorates over time. The primary sources of information driving this methodology are measurements taking along the engine's gas path, such as temperatures, pressures, speeds, etc. These measurements are typically monitored during stable cruise conditions and stored for the purpose of performing a Module Performance Analysis (MPA). Because of the inherent limitation of available measurements in commercial and military aero-engines, there is a difficulty in differentiating between various faults in the turbine section of the engine. Two typical faults that fall in this category are turbine case cooling (TCC) and high pressure turbine (HPT) performance faults.

Current MPA methods use steady state cruise data to perform fault isolation. The parameters that are monitored are rotational speeds, temperatures, and pressures taken at various stages along an engine's gas path. When a shift in these measured quantities is detected, a percent $\Delta$ is computed for each gas path parameter, capturing the level and direction of the shift. The resulting vector of measurement parameter $\Delta$s is used to compute the MPA.

The calculation is effectively a pattern matching methodology, wherein the analysis compares the computed percent $\Delta$ vector to a series of other vectors representing known faults, and the best match is selected. This type of analysis has many methodologies and variants known in the art. Unfortunately, the signatures of HPT and TCC performance faults are nearly identical in terms of the commonly measured gas path parameters and are indistinguishable within the confines of this analysis, no matter what particular methodology is employed.

Current methods in performance tracking cannot differentiate between HPT performance faults and TCC faults. Although TCC faults are more likely to occur than HPT faults, the benign nature of a TCC fault (increased fuel consumption penalty) if improperly diagnosed may result in the engine remaining on wing with a potential for an in-flight shutdown (IFSD) or catastrophic event if the underlying cause had been an HPT problem instead. What is needed is a method and system that mitigates the risk of a TCC/HPT misdiagnosis.

SUMMARY OF THE INVENTION

Although there are various methods and systems employing performance tracking to differentiate between HPT and TCC performance faults, such methods and systems are not completely satisfactory. The inventor has discovered that it would be desirable to have methods and systems that distinguish between turbine case cooling (TCC) and high pressure turbine (HPT) performance faults.

One aspect of the invention provides a method for distinguishing between gas turbine engine case cooling (TCC) and high pressure turbine (HPT) performance faults. Methods according to this aspect of the invention preferably start with acquiring a predetermined number of in-flight gas path data samples corresponding to a predetermined number of engine parameters, determining if a percent $\Delta$ shift has occurred in a gas path engine parameter, if a percent $\Delta$ signature shift has occurred, determining whether the shift is from an HPT or TCC performance fault comprising, extracting exhaust gas temperature shift magnitudes from the predetermined number of engine parameters, calculating an exhaust gas temperature differential between in-flight and take-off exhaust gas temperature margin calculations, wherein the exhaust gas temperature differential is the difference between the change in exhaust gas temperature margin and the exhaust gas temperature shift magnitudes, calculating a TCC event likelihood and a non-TCC event likelihood, wherein if the TCC event is greater than or equal to the non-TCC event likelihood, declaring a TCC fault.

Another aspect of the method includes determining whether the shift is from an HPT or TCC performance fault. This aspect further comprises obtaining take-off exhaust gas temperature margin calculations for the present flight and from a previous flight, and calculating a change in exhaust gas temperature margin calculations between the present flight and a previous flight.

Yet another aspect of the method includes calculating the likelihood of a TCC or non-TCC event. This aspect further comprises obtaining a mean and standard deviation for gas turbine engines not experiencing TCC faults, obtaining a mean and standard deviation for gas turbine engines experiencing TCC faults, and calculating an exhaust gas temperature difference between cruise and take-off conditions.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the method and system may be implemented in software or hardware.

The invention is a modular framework and may be deployed as software as an application program tangibly embodied on a program storage device. The application code for execution can reside on a plurality of different types of computer readable media known to those skilled in the art.

Current MPA methods monitor rotational speeds, temperatures, and pressures taken at various stages along an engine's gas path to conduct performance estimation tracking and fault isolation. The data is time-averaged at a stable cruise flight condition, normalized to standard reference conditions and compared to a reference baseline model to produce a vector comprised of percent Δs. The vector represents a time sequence of gas path performance history and is generally trended to aid in detecting health deviations and fault events.

Figure 1A:
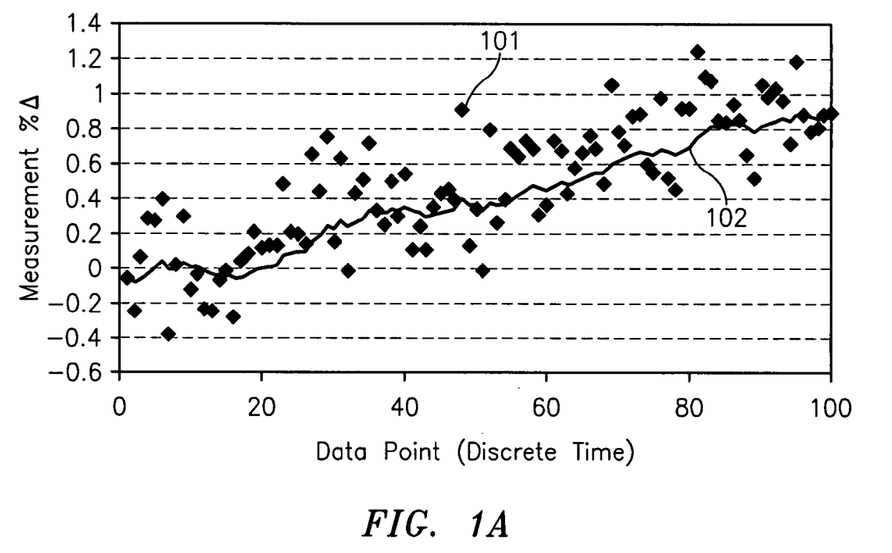
FIG. 1A is an exemplary plot showing a gas path measurement parameter percent $\Delta$ trend.

FIG. 1A shows a plot of a typical trend for an arbitrary measurement A parameter such as fuel flow, exhaust gas temperature, or other engine gas path parameter. The gradual upward trend may be indicative of engine degradation. Individual parameter measurement Δ samples 101 and a superimposed average trend line 102 are shown. This is in contrast with FIG. 1B that shows a sudden shift 103 in the parameter measurement Δs that may indicate some type of temporal fault event. The method of the invention analyzes these types of perturbations.

Figure 1B:
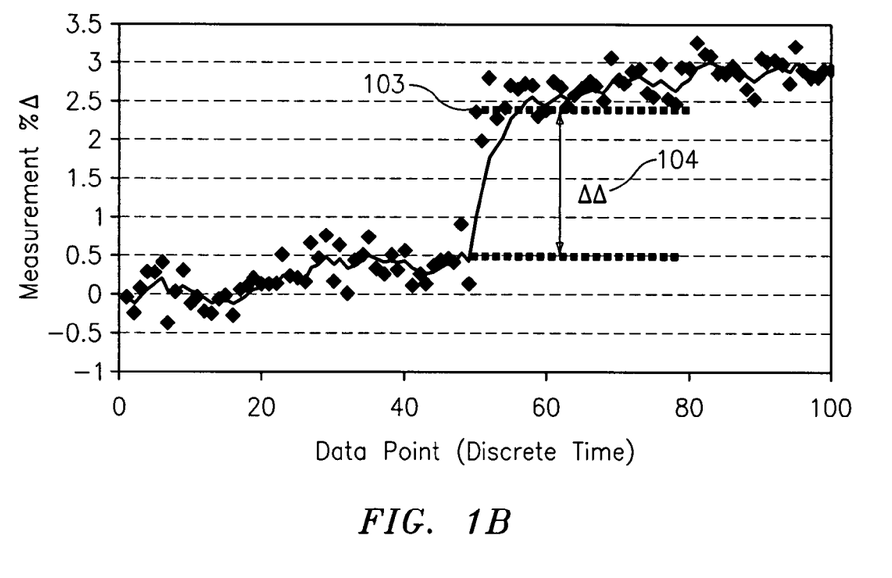
FIG. 1B is an exemplary plot showing a gas path measurement parameter percent $\Delta$ trend that experienced a fault event ($\Delta\Delta$).

When a sudden shift 103 in one or more measured gas path parameter Δs is observed, it usually indicates an underlying fault. A single fault assumption is a common hypothesis since it would be improbable that several engine components, or a multiple component failure, would occur. The underlying fault may be one of many possible faults, such as a component performance fault (rapid change in a major component efficiency or flow due to foreign or domestic object damage), an engine system fault or failure such as an actuator failure controlling variable geometry guide vanes within the engine, or a leak, or failure of one of many engine bleeds used for stability and off-board service such as aircraft air conditioning, etc.

The invention addresses TCC faults. The TCC system controls air flow from a compressor stage bleed. The air is circulated around the outside case of the high pressure turbine (HPT) in an attempt to cool it. Since the air that is bled from the compressor is relatively cool with respect to the HPT case, the bleed air cools the HPT case and allows it to contract. This reduces the HPT turbine blade tip clearances within the case and reduces parasitic bypass losses thereby increasing efficiency, and reducing fuel burn.

Thus, it is not surprising that the signature of measured parameter Δs associated with a TCC failure is like that which would be observed from other faults in the turbine such as blade erosion, blade damage, etc., that also affects HPT efficiency. A TCC fault is a more benign fault than a damaged HPT in the sense that it may only affect fuel efficiency and shorten the life expectancy of the turbine in the long term. HPT damage may lead to an in-flight shutdown of the engine and potential catastrophic engine failure if left undiagnosed and unattended. It is critical to be able to distinguish between these two types of faults.

Since the signatures of the measured parameter Δs are very similar, it is usually not possible to differentiate between them using current gas path analysis methods. The invention uses independent information typically available in aero-engine monitoring systems to effect diagnosis.

Figure 2:
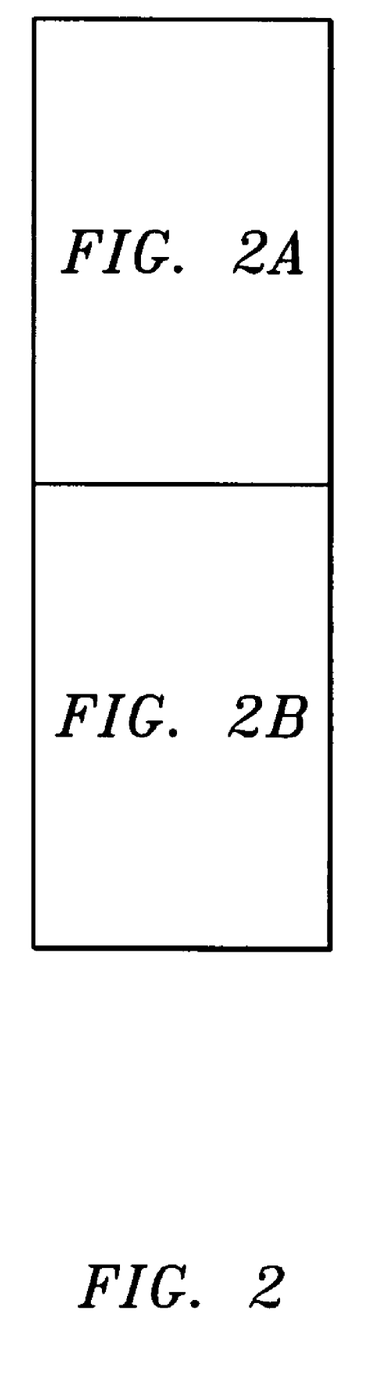
FIG. 2 is a block diagram of an exemplary method that distinguishes between turbine case cooling (TCC) and high pressure turbine (HPT) performance faults.
Figure 2A:
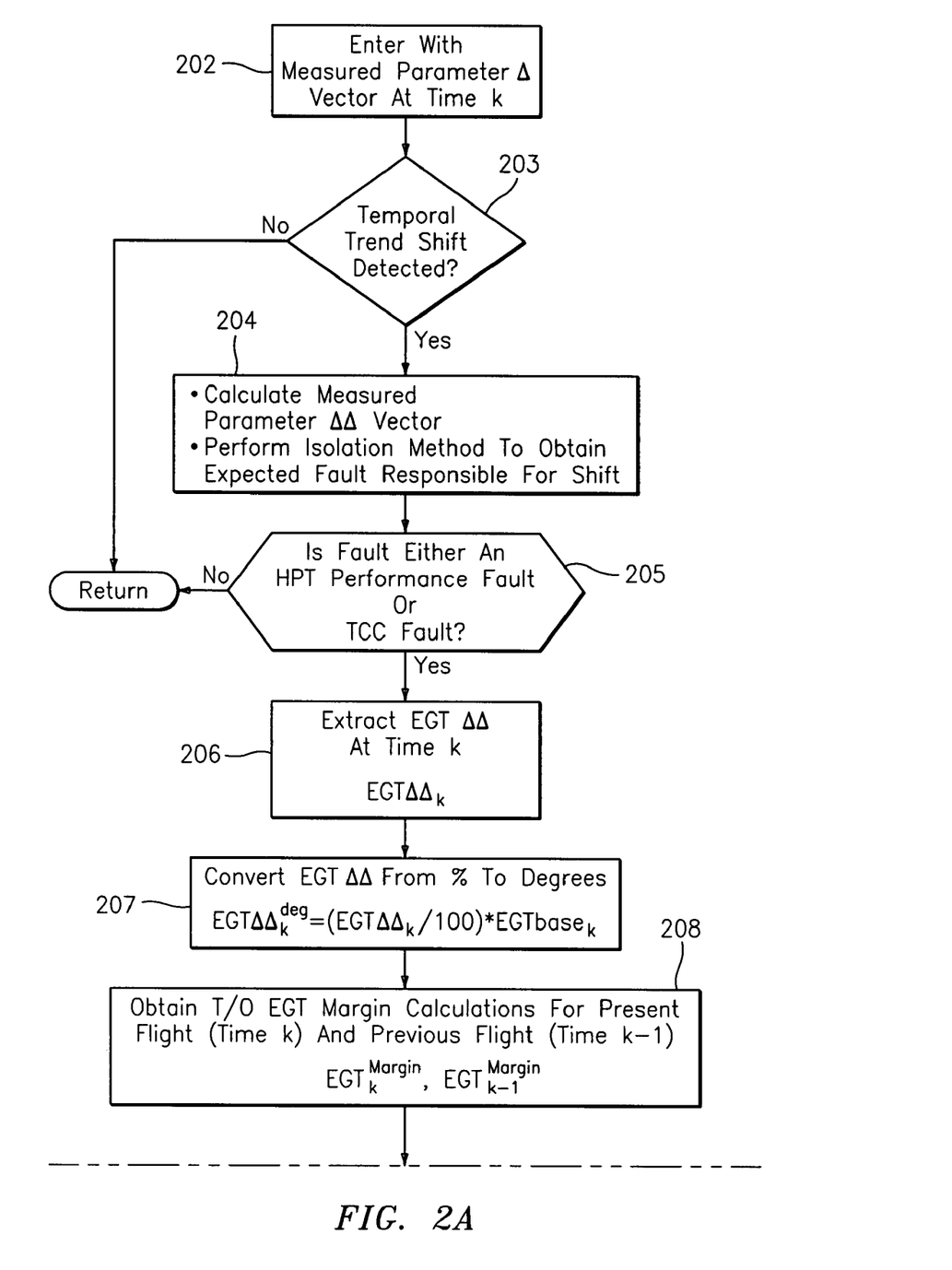
Figure 2B:
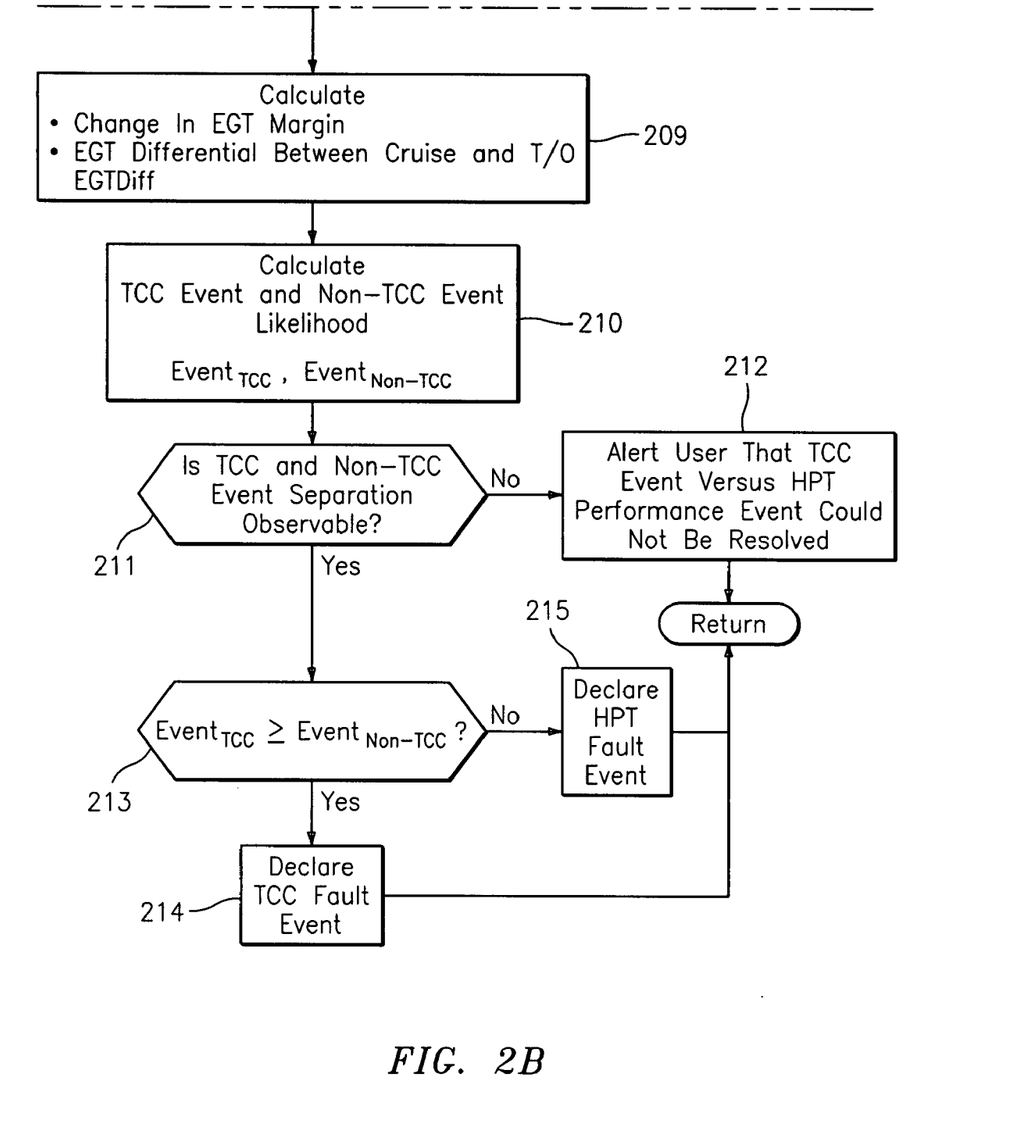

Shown in FIG. 2 is one embodiment of the invention. A measurement percent Δ parameter vector at discrete time k is monitored (step 202). The vector consists of percent Δs derived using a nominal baseline reference, in typically monitored gas path parameters such as rotational speeds, temperatures, and pressures, etc. Comparing this data sample to previously monitored data samples at times k-1, k-2, k-3, ..., k-n, a determination is made whether or not a sudden shift has occurred in any one of the parameters (step 203) as in FIG. 1B. Any reliable methodology may be employed to detect sudden, temporal, shifts in the data. If no sudden shift is detected, the method returns to normal gas path analysis calculations for trending the performance health of the engine.

If a shift is detected (step 203), then the magnitude of the shift is determined (step 204). For example, referring to FIG. 1B, this would be the ΔΔ 104 between the present data point at time k and the previous average level. A ΔΔ is calculated for every measurement parameter in a measurement Δvector. If no shifts occur, that parameter would be zero. This produces a vector of measurement ΔΔs at time k, denoted as $\Delta\Delta_k$. There are numerous isolation methods known that may be employed to determine the single fault yielding the closest match to the observed ΔΔ shift $\Delta\Delta_k$. Isolation methods using Kalman filters, weighted least squares, probabilistic neural networks, trained feed-forward artificial neural networks, and others may be used to provide isolation. This yields the fault type most likely responsible for the shift (step 204).

As described above, if the actual underlying fault responsible for the shift is either a TCC or an HPT performance fault, there will be ambiguity in the isolation determination (step 204). The method determines whether the engine has experienced an HPT fault, a TCC fault, or that it may have been either fault type (step 205). If that is the case, the EGTΔΔ component from the $\Delta\Delta_k$ vector (step 206) is examined. Since EGT is a flight critical parameter, its monitored value is always available. The EGTΔΔ component is denoted by EGT-$\Delta\Delta_k$. Since the measurement parameter Δ vectors are in percent, the computed ΔΔ vector will be in percent and hence EGTΔΔ$_k$ will be in percent. This value may be converted to degrees, ΔΔ °R or ΔΔ °K, (step 207) by $$EGT\Delta\Delta_k^{deg} = \frac{EGT\Delta\Delta_k}{100} \times EGTbase_k, \quad (1)$$

where $EGT\Delta\Delta_k^{deg}$ is the EGTΔΔ in degrees and $EGTbase_k$ is the nominal baseline reference level for EGT in absolute degrees (°R or °K) from which the $k^{th}$ measurement Δ for EGT was calculated.

Additional, independent information may be used to differentiate between a TCC and HPT fault. This information may be in the form of an EGT margin calculation that may be performed during aircraft take-off, either on-board or off-board, and is a standard procedure for commercial and military applications.

EGT margin is the delta between the observed (takeoff) EGT and a pre-defined threshold typically specified by the engine manufacturer. It is calculated by subtracting observed values from threshold values during take-off. A positive margin indicates that the engine is within the pre-defined threshold value. The healthier an engine is, the greater the margin. A zero, or negative margin is typically cause to remove the engine for corrective maintenance.

The EGT margin value for the current flight, at time k, are denoted by $EGT_k^{Margin}$. EGT margin values from a previous flight, at time k-1, are denoted by $EGT_{k-1}^{Margin}$. The $EGT_{k-1}^{Margin}$ value is obtained from a data store (step 208). The change in EGT margin, denoted by $\Delta EGT^{Margin}$ is calculated (step 209)

$$\Delta EGT^{Margin} = EGT_k^{Margin} - EGT_{k-1}^{Margin}. \quad (2)$$

And the EGT difference between cruise and take-off, denoted by EGTDiff, is calculated (step 209)

$$EGTDiff = \Delta EGT^{Margin} + EGT\Delta\Delta_k^{deg}. \quad (3)$$

The addition in (3) effectively performs a subtraction since $\Delta EGT^{Margin}$ and $EGT\Delta\Delta_k^{deg}$ will always be opposite in sign. If the EGT $\Delta$ (from step 202) at time k has increased from what its average was at time k-1 (as shown in FIG. 1B), then $EGT\Delta\Delta_k^{deg}$ will be positive. The margin, or distance to a limit or threshold, however, would be decreased and hence $\Delta EGT^{Margin}$ will be negative.

The method calculates the likelihood of a TCC event given that a TCC and/or HPT isolation has been hypothesized (step 210). The calculation may require several calculations based on empirically derived statistical observations of how EGT and EGT margin distributions react to a TCC event and a non-TCC event.

A statistical sample of engines that have not experienced a TCC failure may be analyzed, and the mean and standard deviation for their measurement $EGT\Delta\Delta$ taken at cruise may be calculated. The $EGT\Delta\Delta$ is from a vector where one of the parameters experienced a shift. The mean and standard deviation for the change in EGT margin, i.e., $\Delta EGT^{Margin}$, may be calculated from the take-off data for this same sample of engines.

Figure 3A:
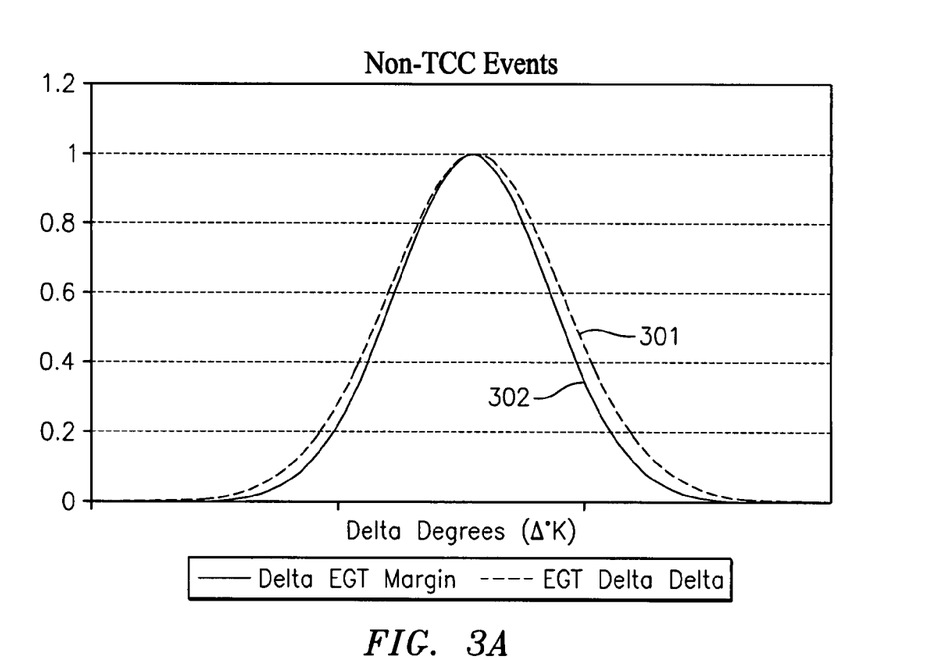
FIG. 3A is an exemplary plot showing an exhaust gas temperature Gaussian distribution for a non-TCC event.
Figure 3B:
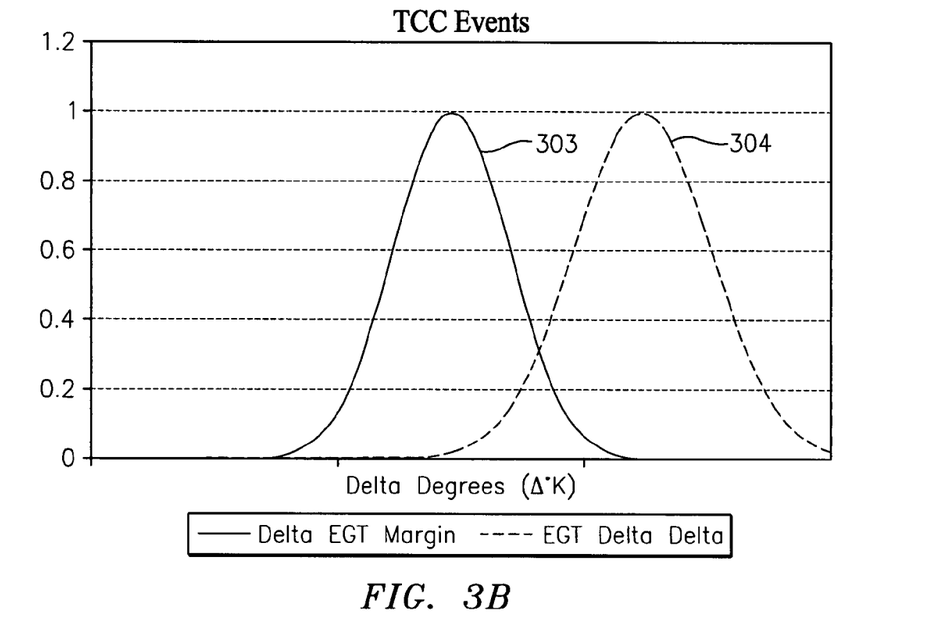
FIG. 3B is an exemplary plot showing an exhaust gas temperature Gaussian distribution for a TCC event.
Figure 3C:
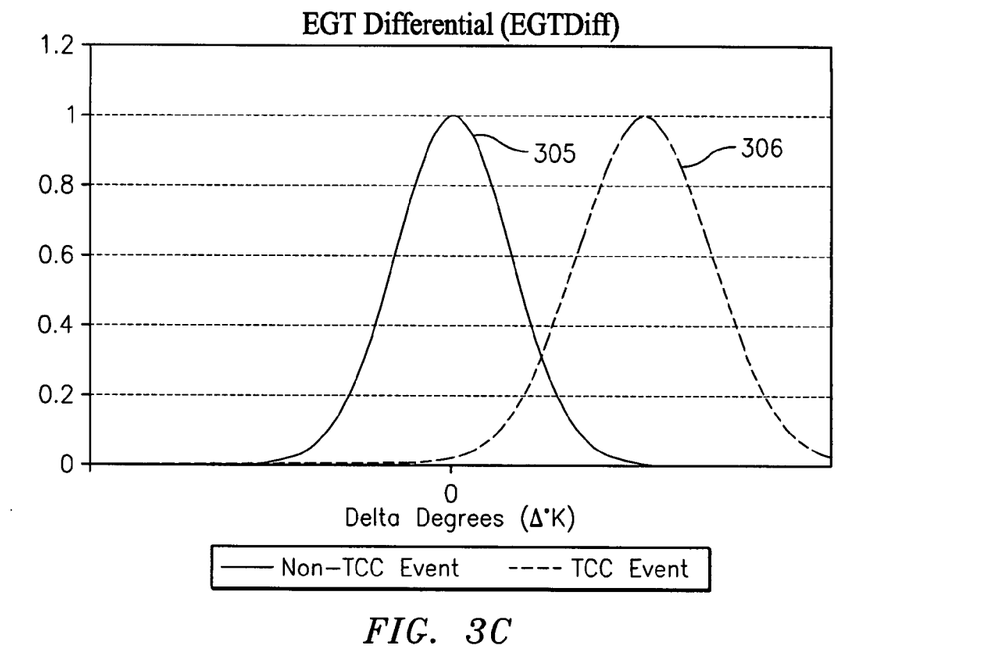
FIG. 3C is an exemplary plot showing an exhaust gas temperature differential Gaussian distribution for a TCC event and a non-TCC event.

Experience has indicated that the distributions for the cruise and take-off data for non-TCC events are very similar. This is shown in FIG. 3A where the distributions for $EGT\Delta\Delta$ 301 and $EGT^{Margin}$ 302 assume a normally distributed population. In contrast, FIG. 3B shows similar statistics from engine samples having experienced TCC events. In this case, the change in EGT margin, $\Delta EGT^{Margin}$, and the cruise $EGT\Delta\Delta$ shifts have significantly different mean values. The invention exploits these properties.

Since EGTDiff is the sum of $EGT\Delta\Delta$ and $\Delta EGT^{Margin}$, its distribution is centered at zero degrees for a non-TCC event 303 and offset at a positive mean for a TCC event 304. These are shown in FIG. 3B and the distributions are a direct consequence of the distributions obtained empirically for $EGT\Delta\Delta$ 304 and $\Delta EGT^{Margin}$ 303.

From empirical observation, the mean and standard deviation for EGTDiff, for a non-TCC event, is denoted by $\alpha_{Non-TCC}$ and $\beta_{Non-TCC}$ respectively, and the mean and standard deviation for EGTDiff, for a TCC event, denoted by $\alpha_{TCC}$ and $\beta_{TCC}$, respectively.

The likelihood that the observed shift is due to a TCC event is denoted by $Event_{TCC}$, and is calculated (step 210) by $$Event_{TCC} = e^{-\frac{1}{2}\left(\frac{EGTDiff - \alpha_{TCC}}{\beta_{TCC}}\right)^2}, \quad (4)$$

where e is 2.718.

The likelihood that the observed shift is due to a non-TCC event is denoted by $Event_{Non-TCC}$, and is calculated (step 210) by $$Event_{Non-TCC} = e^{-\frac{1}{2}\left(\frac{EGTDiff - \alpha_{Non-TCC}}{\beta_{Non-TCC}}\right)^2}. \quad (5)$$

It is possible that these two magnitudes may be close in value, i.e. that their absolute difference could be less than some predefined Threshold, $$|Event_{TCC} - Event_{Non-TCC}| < Threshold. \quad (6)$$

Figure 3D:
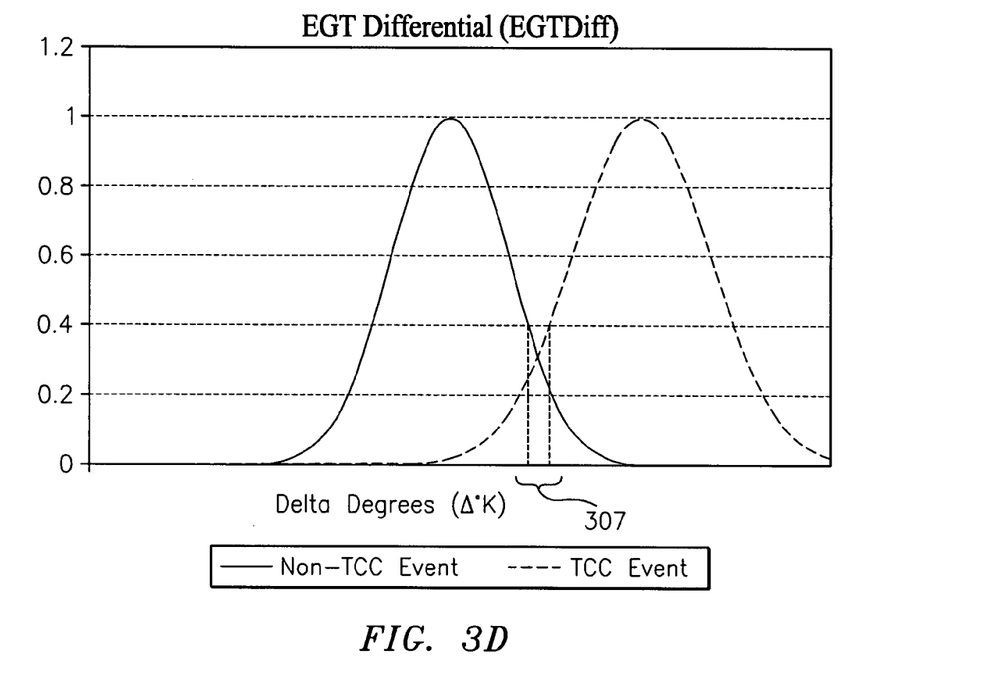
FIG. 3D is an exemplary plot showing an exhaust gas temperature differential Gaussian distribution region where TCC and non-TCC event separation is not observable.

This occurs when the calculated EGT differential, EGT-Diff, is in a region overlapping both tails of the TCC vs. non-TCC distribution. This is shown in FIG. 3D 307. In this instance, the TCC and non-TCC event hypothesis is not observable (step 211) and an alert is made to a user that the ambiguity could not be resolved (step 212).

If the absolute difference is greater than the predefined threshold, a check is performed to see if the likelihood of the TCC event hypothesis, $Event_{TCC}$, is greater than the likelihood of a non-TCC event hypothesis, $Event_{Non-TCC}$, (step 213). If it is, the event is a TCC fault (step 214), otherwise it is an HPT performance fault (step 215).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for distinguishing between gas turbine engine case cooling (TCC) and high pressure turbine (HPT) performance faults comprising:
    monitoring a plurality of gas path parameters of an operating gas turbine engine so as to acquire in-flight gas path data samples from said gas turbine engine, said in-flight gas path data samples corresponding to a predetermined number of engine parameter percent $\Delta$s from nominal;
    inputting said in-flight gas path data samples into a computer;
    determining if a percent $\Delta$ shift has occurred in a gas path engine parameter percent $\Delta$;
    if a percent $\Delta$ signature shift has occurred, determining whether a shift $\Delta\Delta$ is from an HPT or TCC performance fault, said shift $\Delta\Delta$ determining step comprising:
        extracting exhaust gas temperature shift magnitudes from the predetermined number of engine parameters;
        converting said exhaust gas temperature shift magnitudes from percent to degrees;
        obtaining take-off EGT margin calculations for present flight time and previous flight time;
        calculating an exhaust gas temperature differential between in-flight and take-off exhaust gas temperature margin calculations, wherein the exhaust gas temperature differential is the difference between the change in exhaust gas temperature margin and the exhaust gas temperature shift magnitudes;
        calculating a TCC event likelihood and a non-TCC event likelihood; obtaining a mean and standard deviation for gas turbine engines not experiencing TCC faults; obtaining a mean and standard deviation for gas turbine engines experiencing TCC faults; and calculating an exhaust gas temperature difference between cruise and take-off conditions comparing said calculated TCC event likelihood to said calculated non-TCC event likelihood; and declaring a TCC performance fault if the calculated TCC event likelihood is greater than or equal to the calculated non-TCC event likelihood, wherein calculating the likelihood of a TCC or non-TCC event further comprises:

obtaining a mean and standard deviation for gas turbine engines not experiencing TCC faults;

obtaining a mean and standard deviation for gas turbine engines experiencing TCC faults, and calculating an exhaust gas temperature difference between cruise and take-off conditions.

2. The method according to claim 1 wherein the step of determining whether the shift is from an HPT or TCC performance fault further comprises:

obtaining take-off exhaust gas temperature margin calculations for the present flight and from a previous flight; and calculating a change in exhaust gas temperature margin calculations between the present flight and a previous flight.

3. The method according to claim 1 further comprising trending the predetermined number of gas path engine parameters while in-flight.

4. The method according to claim 1 wherein EGT margin is a delta between the observed (takeoff) EGT and a pre-defined threshold.

5. The method according to claim 4 wherein a positive margin indicates that the engine is within the pre-defined threshold value.

6. The method according to claim 5 wherein a zero or negative margin indicates that the engine requires maintenance.

7. The method according to claim 6 wherein $\Delta$EGT margin is approximately the same, but having opposite polarity, as the $\Delta$EGT shift magnitude when TCC is not an underlying problem.

8. The method according to claim 7 further comprising calculating confidence metrics for TCC event likelihoods and non-TCC event likelihoods to obviate the effect of measurement non-repeatability.

9. The method according to claim 8 wherein the confidence metrics is a fuzzy confidence measure.

* * * * *